J. EGAN.
SPRING RELIEF DEVICE FOR VEHICLES.
APPLICATION FILED APR. 18, 1917.
1,369,918.
Patented Mar. 1, 1921.
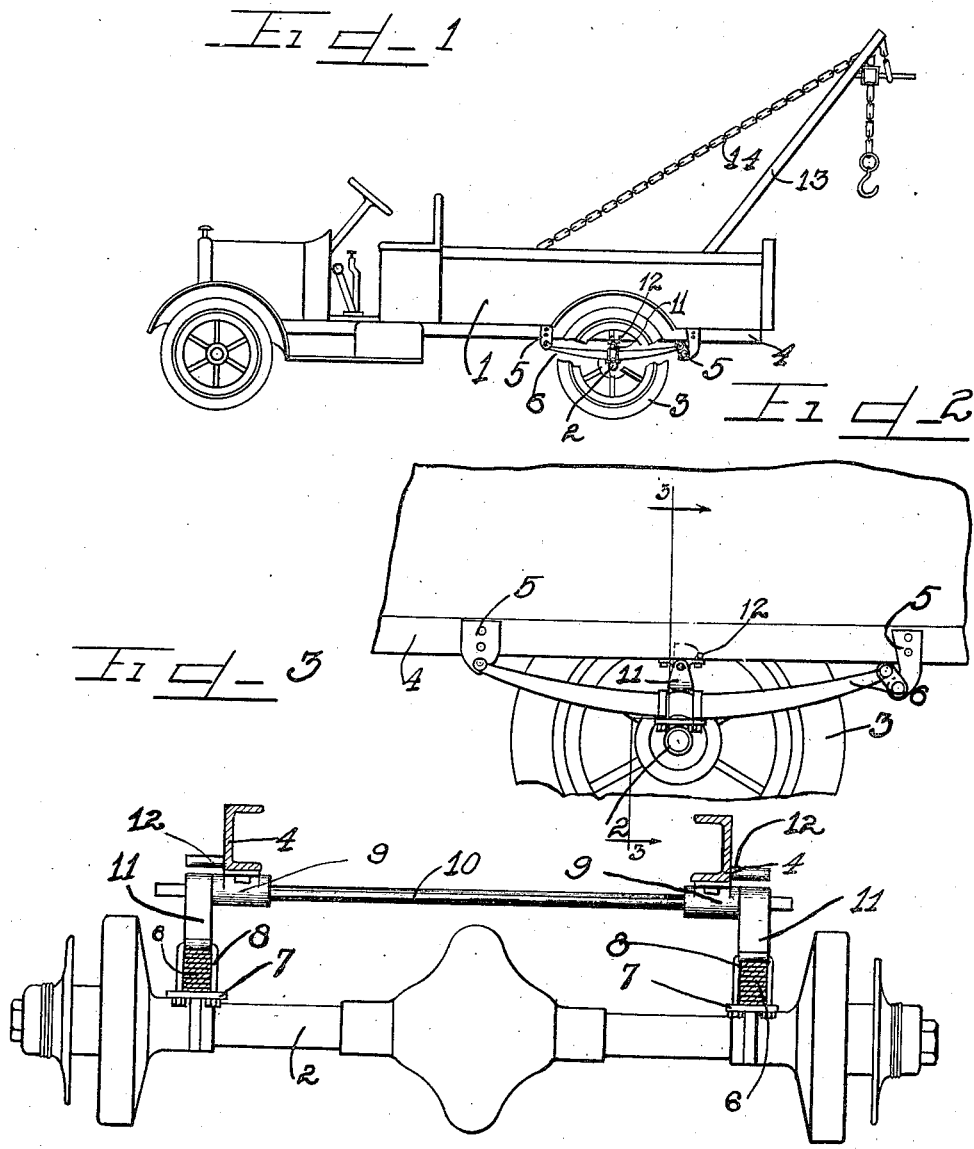

UNITED STATES PATENT OFFICE.

JAMES EGAN, OF CHICAGO, ILLINOIS.

SPRING-RELIEF DEVICE FOR VEHICLES.

1,369,918. Specification of Letters Patent. Patented Mar. 1, 1921.

Application filed April 18, 1917. Serial No. 162,972.

*To all whom it may concern:*

Be it known that I, JAMES EGAN, a citizen of the United States, and a resident of the city of Chicago, in the county of Cook and State of Illinois, have invented certain new and useful Improvements in Spring-Relief Devices for Vehicles; and I do hereby declare that the following is a full, clear, and exact description of the same, reference being had to the accompanying drawings, and to the numerals of reference marked thereon, which form a part of this specification.

This invention relates to mechanism adapted to be mounted upon a vehicle to relieve the springs of stress by establishing a direct support between the central anchored portion of the springs and the frame of the vehicle, whereby the vehicle is supported directly upon the axle. It is desirable to use this device in connection with a wrecking truck, for instance, one such as shown in my Patent No. 1,116,579, issued November 10th, 1914, when the elevating crane upon the truck is being used to support a load, so that a rigid non-yieldable base or foundation for the crane is afforded. The device is, of course, adapted to be swung into position out of use to permit the vehicle to be supported on the axle through the springs. My invention is adaptable to other vehicles than wrecking trucks, and may be made an adjunct of any vehicle as a safety mechanism to properly support the frame of the vehicle upon the axle in the event of any of the springs being damaged or broken.

It is an object therefore of this invention to construct a device which, by movement into operating position, establishes a direct supporting connection between the frame or body of the car and the axle thereof, thereby relieving the springs of supporting stress and affording a solid and rigid support for the body of the car.

It is also an object of this invention to construct an intermediate supporting mechanism for interconnection between the frame and axle of a car adapted when swung into operating position to establish a direct supporting connection between the frame of the car and its axle to relieve the springs of supporting stress.

It is furthermore an object of this invention to construct adjustable mechanism normally swung into position out of use, and when swung into position for use, to afford a supporting connection between the frame of the vehicle and axle thereof in the event of failure of a spring or if it is desired to establish a non-yieldable connection between the body of the car and its axle, and to relieve the springs of supporting stress.

Other and further important objects of the invention will be evident from the disclosure in the specification and drawings.

The invention (in a preferred form) is illustrated in the drawings and hereinafter more fully described.

On the drawings:

Figure 1 is a fragmentary side elevation partly broken away, of a wrecking truck equipped with a mechanism embodying the principles of my invention.

Fig. 2 is an enlarged side elevation showing the mechanism in operating position and with one of the drive wheels of the vehicle omitted.

Fig. 3 is a fragmentary sectional detail on line 3—3 of Fig. 2, with parts omitted and parts shown in elevation.

As shown on the drawings:

The reference numeral 1, indicates as a whole a wrecking truck provided with a rear axle 2, on the ends of which are journaled the driving and supporting wheels 3. The chassis frame sills of the truck are denoted by the reference numeral 4, and are provided with spring shackle brackets 5, to which the ends of semi-elliptic springs 6, are connected. Each of said springs 6, is supported at its middle portion upon a flat bracket plate 7, secured or formed upon the axle housing 2, and is held secured thereto by bolts 8. Attached beneath the frame sills 4, are bearings 9, and journaled therein transversely of the vehicle is a shaft 10, with sector shaped wedge or supporting blocks 11, secured on the outer ends thereof. As shown, when said blocks 11, are swung downwardly into operating position, the blocks bear upon the central portion of the respective springs 6, thereby supporting the vehicle frame thereon through the shaft 10, and when swung upwardly into position out of use, as shown in dotted lines in Fig. 2, said blocks rest against stop pins 12, provided in the side sills 1, for the purpose.

The elevating crane of the wrecking truck is denoted by the reference numeral 13, and is provided with a chain 14, which may be operated in any suitable manner, but since the details of this construction form no part of the present invention, further description thereof is unnecessary.

The operation is as follows:

When a load is to be supported or elevated by the crane mechanism of the wrecking truck, the wedge or supporting blocks 11, are swung downwardly from the dotted line position shown in Fig. 2, to the full line position shown in Figs. 2 and 3, thereby affording a rigid supporting connection between the vehicle frame and the axle 2, and relieving the springs 6, of supporting stress. Consequently, the load applied upon the crane will not cause the frame of the vehicle to sag upon the springs with possible dangerous consequences in handling the disabled vehicle, and after the load has been suitably disposed of by the crane, the blocks 11, may be swung upwardly into position out of use by merely rotating the shaft 10. Any suitable handle may be engaged upon the end of said shaft for this purpose.

I am aware that various details of construction may be varied through a wide range without departing from the principles of this invention, and I therefore do not purpose limiting the patent granted otherwise than necessitated by the prior art.

I claim as my invention:

The combination with a vehicle, its frame and axle and springs yieldingly supporting the frame on the axle, of means pivotally mounted so as to depend from the pivotal support and thereby afford a rigid support for the frame and relieve the springs of stress, and a stop adapted, when said means is moved over the pivotal axis to hold said means in the inoperative position.

In testimony whereof I have hereunto subscribed my name in the presence of two subscribing witnesses.

JAMES EGAN.

Witnesses:
  CHARLES W. HILLS, Jr.,
  EARL M. HARDINE.